(12) United States Patent
Badhwar et al.

(10) Patent No.: US 11,617,051 B2
(45) Date of Patent: Mar. 28, 2023

(54) STREAMING BINAURAL AUDIO FROM A CLOUD SPATIAL AUDIO PROCESSING SYSTEM TO A MOBILE STATION FOR PLAYBACK ON A PERSONAL AUDIO DELIVERY DEVICE

(71) Applicant: EmbodyVR, Inc., San Mateo, CA (US)

(72) Inventors: Shruti Badhwar, San Mateo, CA (US); Marielle Venita Jakobsons, Oakland, CA (US); Saarish Kareer, San Mateo, CA (US); Nidhi Sikarwar, Santa Clara, CA (US)

(73) Assignee: EMBODYVR, INC., San Mateo, CA (US)

( * ) Notice: Subject to any disclaimer, the term of this patent is extended or adjusted under 35 U.S.C. 154(b) by 0 days.

(21) Appl. No.: 16/685,305

(22) Filed: Nov. 15, 2019

(65) Prior Publication Data
US 2020/0245092 A1    Jul. 30, 2020

Related U.S. Application Data

(60) Provisional application No. 62/861,760, filed on Jun. 14, 2019, provisional application No. 62/854,609, filed on May 30, 2019, provisional application No. 62/797,904, filed on Jan. 28, 2019.

(51) Int. Cl.
*H04S 7/00* (2006.01)
*H04S 3/00* (2006.01)
*H04L 67/10* (2022.01)
*H04L 65/60* (2022.01)

(52) U.S. Cl.
CPC .............. *H04S 7/304* (2013.01); *H04L 65/60* (2013.01); *H04L 67/10* (2013.01); *H04S 3/008* (2013.01); *H04S 2400/01* (2013.01); *H04S 2400/11* (2013.01); *H04S 2420/01* (2013.01); *H04S 2420/11* (2013.01)

(58) Field of Classification Search
CPC ...... H04S 7/304; H04S 3/008; H04S 2400/01; H04S 2400/11; H04S 2420/01; H04S 2420/11; H04S 1/005; H04R 5/033
USPC .............................. 381/303, 309, 310, 17–19
See application file for complete search history.

(56) References Cited

U.S. PATENT DOCUMENTS

| | | | |
|---|---|---|---|
| 9,560,465 B2 * | 1/2017 | Stein | H04S 7/301 |
| 9,621,991 B2 * | 4/2017 | Virolainen | H04R 29/005 |
| 2013/0202129 A1 | 8/2013 | Kraemer et al. | |
| 2016/0100268 A1 | 4/2016 | Stein et al. | |

(Continued)

FOREIGN PATENT DOCUMENTS

KR      20160102683 A      8/2016

OTHER PUBLICATIONS

PCT Application Serial No. PCT/US2019/061706, International Search Report, dated Mar. 6, 2020, 3 pages.

(Continued)

*Primary Examiner* — Xu Mei (57) ABSTRACT

Spatial audio is received from an audio server over a first communication link. The spatial audio is converted by a cloud spatial audio processing system into binaural audio. The binauralized audio is streamed from the cloud spatial audio processing system to a mobile station over a second communication link to cause the mobile station to play the binaural audio on the personal audio delivery device.

19 Claims, 6 Drawing Sheets

(56) References Cited

U.S. PATENT DOCUMENTS

2016/0241980 A1    8/2016  Najaf-Zadeh et al.
2018/0295463 A1   10/2018  Eronen et al.
2018/0352359 A1*  12/2018  Edry ...................... H04L 67/10
2019/0289416 A1*   9/2019  York ...................... G06F 1/163

OTHER PUBLICATIONS

PCT Application Serial No. PCT/US2019/061706, International Written Opinion, dated Mar. 6, 2020, 5 pages.
Gorzel, et al., "Efficient Encoding and Decoding of Binaural Sound with Resonance Audio", Audio Engineering Society, Conference Paper 68, Mar. 2019, 12 pages.
Kares, et al., "Streaming Immersive Audio Content", Audio Engineering Society Conference Paper, 2016, 8 pages.
Mayumi, "New content form created by avexr studio", [online] retrieved on Jun. 14, 2019 from <https://pro.miroc.co.jp/headline/avexr-studio/> (machine translated), 2018, 24 pages.
Narbutt, et al., "Streaming VR for Immersion: Quality Aspects of Compressed Spatial Audio", Dublin Institute of Technology Conference Papers, 2017, 7 pages.
Politis, et al., "JSAmbisonics: A Web Audio Library for Interactive Spatial Sound Processing on the web", 2016, 9 pages.
U.S. Appl. No. 16/793,877, Non-Final Office Action, dated Sep. 23, 2020, 8 pages.

* cited by examiner

STREAMING BINAURAL AUDIO FROM A CLOUD SPATIAL AUDIO PROCESSING SYSTEM TO A MOBILE STATION FOR PLAYBACK ON A PERSONAL AUDIO DELIVERY DEVICE

RELATED DISCLOSURES

This disclosure claims the benefit of priority under 35 U.S.C. § 119(e) of U.S. Provisional Application No. 62/797,904 filed Jan. 28, 2019 entitled "Real-Time System to Stream 3D Personalized Spatial Audio over Headphones", U.S. Provisional Application No. 62/854,609 filed May 30, 2019 entitled "Real-Time, Low Bandwidth and Device-Agnostic System to Stream Binaural Audio over Headphones", and U.S. Provisional Application No. 62/861,760 filed Jun. 14, 2019 entitled "Real-Time, Low Bandwidth and Device-Agnostic System to Stream Binaural Audio over Headphones", the contents each of which are herein incorporated by reference in their entireties.

FIELD OF DISCLOSURE

This disclosure relates to consumer goods and, more particularly, to streaming binaural audio from a cloud spatial audio processing system to a mobile station for playback on a personal audio delivery device such as a headphone, hearable, earbuds, hearing aids or other ear accessories connected to the mobile station.

BACKGROUND

Spatial audio is a type of immersive audio which provides a listener with a spatially aware sound experience. Sound is perceived in a three-dimensional space around the listener. Multi-channel audio, ambisonic audio, and object-based audio are three examples of spatial audio.

Multi-channel audio defines audio signals for a specific spatial configuration of speakers such as a number of speakers at eye level, a number of subwoofers, and a number of overhead speakers. For example, 5.1.4 multi-channel audio defines the audio signals for a specific layout of 10 speakers positioned in the room which include 5 speakers positioned at eye level, 1 subwoofer, and four overhead speakers, where each speaker receives respective audio signals. Dolby Audio is one example of the multi-channel audio.

Ambisonic audio represents sound as a full sphere sound field where a first audio signal carries amplitude information for the sound field, while the other audio signals indicate directionality through phase relationships between each other. First order ambisonic audio (FOA) is represented as an omnidirectional gain and three dimensional components: forward/backwards, left/right, and up/down with higher order ambisonics (HOA) to significantly improve quality of the spatialized audio. The audio signals associated with ambisonic audio are decoded to one or more speakers to allow a sound producer to master sound based on the sound field rather than a speaker position giving a listener flexibility in speaker setup.

Object-based audio is a variation of ambisonic audio and multi-channel audio. Object-based audio defines audio signals associated with objects accompanied by metadata that completely describes its existence, position and function. Like ambisonic audio, the audio signals associated with object-based audio are decoded to one or more speakers to allow a listener to fully adjust the object-based audio to their specific listening environment, needs and liking also without being limited a specific speaker setup.

Often in music, gaming, and virtual reality, spatial audio is streamed to a mobile station such as a smartphone, laptop, or tablet. In order for a listener to listen to the spatial audio, the mobile station binauralizes the spatial audio into binaural audio composed of two binaural channels, a left and right binaural channel. The left and right binaural channel are provided to a personal audio delivery device such as headphones, hearables, earbuds, hearing aids or other ear accessories connected to the mobile station for playback to a left and right ear of the listener. Binauralizing the spatial audio on the mobile station requires high bandwidth to receive the streamed spatial audio as well as high compute power on the mobile station to convert the spatial audio to the binaural audio while preserving the spatialization. As a result, a spatially aware sound experience is difficult to provide on most mobile stations.

BRIEF DESCRIPTION OF THE DRAWINGS

Features, aspects, and advantages of the presently disclosed technology may be better understood with regard to the following description, appended claims, and accompanying drawings where:

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows that embody the disclosure. However, it is understood that this disclosure may be practiced without these specific details. For instance, this disclosure describes a process of streaming binaural audio from a cloud spatial audio processing system to a mobile station such as a mobile phone, tablet, or laptop for playback on a personal audio delivery device such as a headphone, hearable, earbuds, hearing aids or other ear accessories connected to the mobile station in illustrative examples. Well-known instruction instances, protocols, structures and techniques have not been shown in detail in order not to obfuscate the description.

Overview

A typical mobile station has a bandwidth to receive between 4 to 16 audio signals of spatial audio even though content associated with spatial audio is recorded at a much higher resolution such as 64 to 128 audio signals of spatial audio. In order to stream the spatial audio to the typical mobile station, the audio signals are downconverted to a lower number of audio signals indicative of reduced resolution of the spatial audio. For example, multi-channel audio recorded as 64 audio signals is downconverted to 10 audio signals associated with a 5.1.4 speaker configuration and then streamed to the mobile station. As another example, 49 audio signals of higher order ambisonic (HOA) is downconverted to 4 audio signals associated with first order ambisonic (FOA) and then streamed to the mobile station. Because of the downconversion and subsequent conversion of the audio signals to binaural audio by the mobile station, a spatial audio experience on the mobile station is not as good as if the higher number of audio signals is able to be streamed to the mobile station. Further, the mobile station has limited compute power to convert the spatial audio to the binaural audio. The limited compute power further restricts the number of audio signals of spatial audio which the mobile station can binauralize. The mobile station might be able to receive 8 audio signals of spatial audio, but if available compute power is only able to binauralize 4 audio signals of spatial audio, then the spatial audio experience is limited to the 4 audio signals.

Embodiments described herein are directed to a cloud spatial audio processing system in the cloud which binauralizes the spatial audio and then streams the binauralized audio to the mobile station. The cloud generally refers to centralized or distributed computing resources and storage resources on networked servers available via a network such as the Internet. Available bandwidth and compute power in the cloud is more than what is available on most mobile stations which allows the cloud spatial audio processing device to receive more audio signals of spatial audio than what a mobile station would be able to receive and binauralize. The available compute power in the cloud also allows for personalizing the binaural audio to a listener's head related transfer function (HRTF) rather than to a generalized HRTF. In this regard, binauralizing the spatial audio in the cloud instead of the mobile station binauralizing the spatial audio provides the listener with a similar or better spatial audio experience.

The description that follows includes example systems, apparatuses, and methods that embody aspects of the disclosure. However, it is understood that this disclosure may be practiced without these specific details. In other instances, well-known instruction instances, structures and techniques have not been shown in detail in order not to obfuscate the description.

Example System

Figure 1:
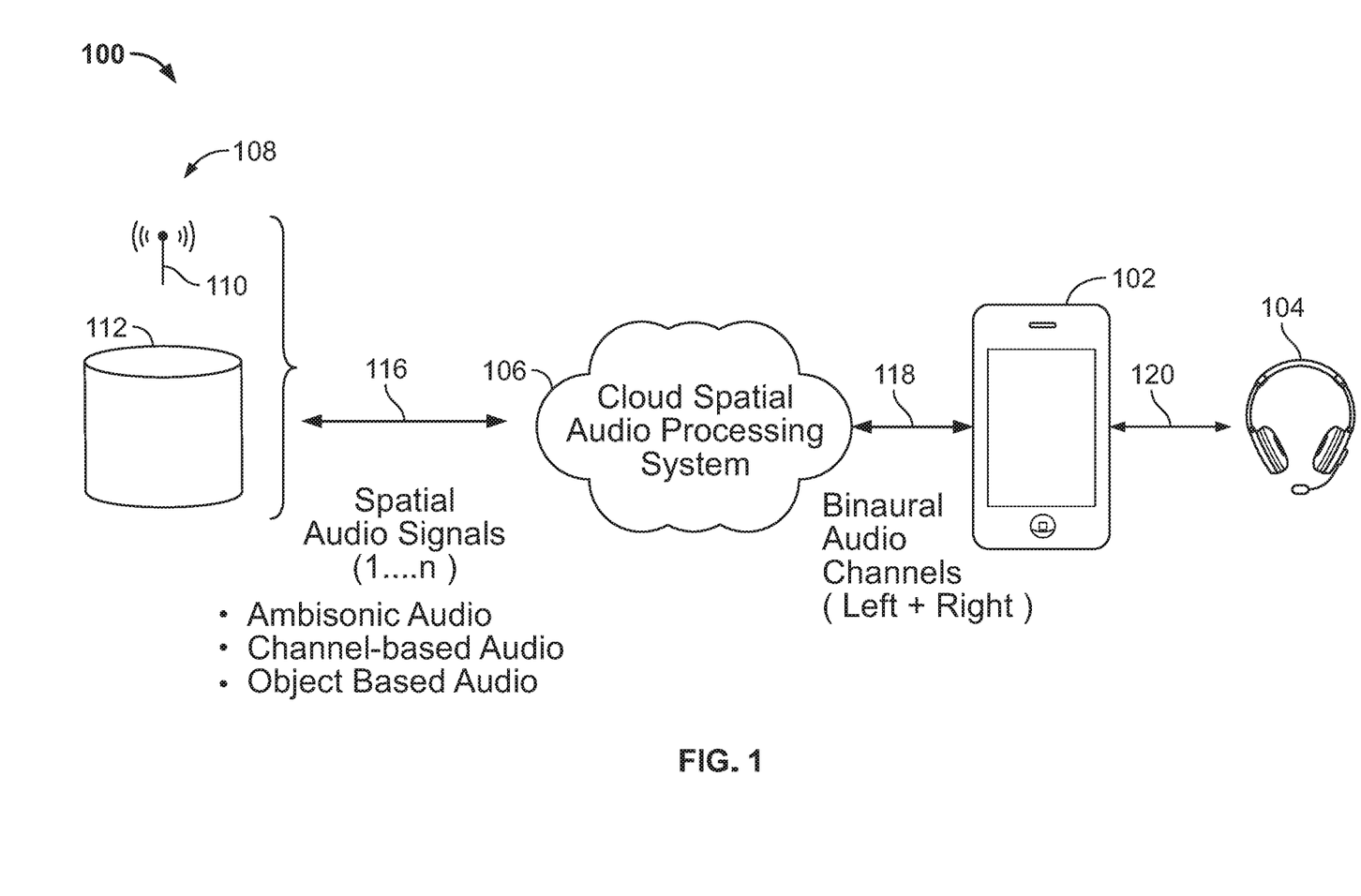
FIG. 1 illustrates an example system for binauralizing spatial audio into binaural audio in the cloud and streaming the binaural audio to a mobile station having a personal audio delivery device.

FIG. 1 illustrates an example system 100 for binauralizing spatial audio into binaural audio in the cloud and streaming the binaural audio to a mobile station associated with a personal audio delivery device. The example system 100 includes the mobile station 102, the personal audio delivery device 104, and a cloud spatial audio processing system 106.

The mobile station 102 may be a portable device such as a smartphone, tablet, or laptop computer. The mobile station 102 may be communicatively coupled to the personal audio delivery device 104 via a communication link 120 and likewise the mobile station 102 may be communicatively coupled to the cloud spatial audio processing system via a communication link 118. The personal audio delivery device 104 may take the form of a headset, headphone, earbuds, or hearing aids, among other ear accessories. In examples, the communication link 120 may take the form of a wired connection or wireless connection such as Bluetooth. In examples, the communication link 118 may take the form of a wired connection or wireless connection such as a $3^{rd}$ generation (3G), $4^{th}$ generation (4G), $5^{th}$ generation (5G) or WiFi connection.

A cloud spatial audio processing system 106 may binauralize spatial audio. In examples, the cloud spatial audio processing system 106 may be located in a cloud. The cloud generally refers to centralized or distributed computing resources and storage resources such as networked servers available over a network such as the Internet. The cloud provides on-demand availability of computer system resources, especially data storage and compute power to the cloud spatial audio processing system 106.

The cloud spatial audio processing system 106 may receive over a communication link 116 spatial audio from an audio server 108 which outputs spatial audio associated with a live audio source 110 or audio captured, created and/or stored in audio storage 112 (on-demand audio). The spatial audio from the audio server 108 may take many forms. In one example, the spatial audio may be associated with a speaker-based approach for spatializing audio. Multi-channel audio is an example of this speaker-based approach. In the speaker-based approach, speakers are positioned around a listener. Multi-channel audio defines respective audio signals for speakers positioned around the listener and is represented in an x.y.z format. X, y, and z each correspond to a speaker positioned in a specific location with respect to a listener. In multi-channel audio, the x indicates a number of speakers at eye level, the y indicates a number of subwoofers, and the z indicates a number of overhead speakers. For example, a 7.1.2 multi-channel audio may correspond to 10 audio signals of spatial audio. As another example, a 5.1 multi-channel audio may correspond to 6 audio signals of spatial audio. In yet another example, a 9.1.2 multi-channel audio may correspond to 12 audio signals of spatial audio. Dolby Audio is one example of this multi-channel audio.

In another example, the spatial audio may be associated with a scene-based approach for spatializing audio. The scene-based approach produces spatial audio by defining audio signals representative of a sound field. Ambisonic audio is an example of the scene-based approach which produces an immersive 360 degree sound experience. A first order B-format ambisonics (FOA) may include 4 spherical harmonic components namely an omnidirectional gain (W) and three directional components X, Y and Z such as forward/backwards, left/right, and up/down with higher order ambisonics (HOA) significantly improving quality of the spatialized audio. B-format is an audio format where a first audio signal of the B-format carries amplitude information for the sound field, while the other audio signals determine the directionality through phase relationships between each other. A higher quality of experience, at the cost of greater bandwidth can be achieved by defining higher order B-format ambisonics (HOA). For reference, third-order ambisonic audio defines 16 audio signals of spatial audio, and sixth-order ambisonic audio defines 49 audio signals of spatial audio.

In yet another example, the spatial audio may be associated with object-based audio. Object-based audio is a variation of ambisonic audio and multi-channel audio. An audio object is sound placed and moved around a room such that the sound appears to be coming from a designated spot such as a bee flying over the listener's head, crowd noise, or commentary to a sporting event. The object-based audio defines audio signals associated with audio objects. The audio signals include audio along with metadata about the object's position, including azimuth and elevation, and potentially distance or width information associated with the object.

The audio server 108 may output spatial audio comprising audio signals 1 . . . n of multi-channel audio, ambisonic audio, or object-based audio. The spatial audio may be generated by one or more of these approaches. The spatial audio may be live from a live audio source 110 such as a live broadcast. Alternatively, the spatial audio may be stored on the audio storage 112 and available on-demand. The spatial audio may be a (i) live multichannel audio stream, (ii) an on-demand multichannel audio stream, (iii) live object-based audio converted to a multichannel audio stream, (iv) on-demand object-based audio stream converted to a multichannel audio stream. Alternatively, the spatial audio may be different audio signals associated with ambisonic audio such as (i) live first order ambisonic audio stream, (ii) an on-demand first order ambisonic audio stream, (iii) a live object-based audio converted to first-order ambisonic stream, (iv) an on-demand object based audio converted to first-order ambisonic stream, (v) live higher-order ambisonic audio converted to first-order ambisonic stream, or (vi) on-demand higher-order ambisonic audio converted to first-order ambisonic stream. The spatial audio output by the audio server 108 may take other forms as well.

In examples, the cloud spatial audio processing system 106 may convert the spatial audio associated with the multi-channel audio, ambisonic audio, and/or object-based audio into binaural audio. The spatial audio may be binauralized in the cloud instead of being binauralized on the mobile station 102. The binaural audio may be represented as two binaural channels of sound such as a left and right binaural channel to be output by the personal audio delivery device 104 to a left ear and right ear. The cloud spatial audio processing system 106 may stream the binaural audio to the mobile station 102 over the communication link 118 such as the 3G, 4G, 5G, or WiFi connection. The mobile station 102 may then provide the binaural audio to the personal audio delivery device 104 for playback to the listener over the communication link 120. With streaming audio, a listener does not have to wait to download a file to play it. The cloud spatial audio processing system 106 may stream binaural audio to the mobile station 102 for playback by the personal audio delivery device 104 in real time.

In some examples, the cloud spatial audio processing system 106 may support a "fog" computing architecture (not shown) which includes one or more of data, storage and/or compute devices in proximity to the mobile station 102. Fog computing refers to extending cloud computing to the edge of a network. The fog computing architecture uses edge devices to carry out a substantial amount of computation, storage, communication locally. The edge device that is selected may be proximate to the mobile station 102 so that latency to the mobile station 102 is reduced in providing the binaural audio to the mobile station 102. For example, the edge device and the mobile station 102 may be located close together to minimize latency associated with binauralization in the cloud.

The communication link 118 may have a bandwidth less than that of communication link 116 over which the audio server 108 may send the spatial audio to the cloud spatial audio processing system 106. In this regard, the spatial audio may have a bandwidth greater than what can be sent to the mobile station 102 over the communication link 118 and a bandwidth greater than the binaural audio. Binauralization by the cloud spatial audio processing system 106 reduces the plurality of audio signals of spatial audio to two binaural channels with a bandwidth which can be sent over the communication link 118 while preserving the spatial audio experience. For example, in the case of third-order ambisonic audio, 16 audio signals of ambisonic audio may be reduced to 2 binaural channels of binaural audio while preserving a similar spatial experience as listening to the 16 audio signals of ambisonic audio. As another example, 10 audio signals of 7.1.4 audio may be reduced to 2 binaural channels of binaural audio while preserving a similar spatial experience as listening to the 10 audio signals of 7.1.4 audio. In yet another example, 5.1 multi-channel audio content may include 6 audio signals. Binauralization in the cloud reduces the 6 audio signals of ambisonic audio to 2 binaural channels of binaural audio while preserving a similar spatial experience as listening to the 6 audio signals of multi-channel audio. As another example, 4 audio signals of ambisonic audio associated with first-order ambisonic audio may be reduced to 2 binaural channels of binaural audio while preserving a similar spatial experience as listening to the 4 audio signals of ambisonic audio.

Additionally, the audio signals of the spatial audio from the audio server 108 do not need to be downconverted to a lower number of audio signals and collectively a smaller bandwidth before transmission to the cloud spatial audio processing system 106 for conversion to the binaural audio. Sufficient bandwidth exists to transmit the audio signals of the spatial audio from the audio server 108 to the cloud spatial audio processing system 106 over the communication link 116. As a result, the cloud spatial audio processing system 106 may convert the audio signals of spatial audio from the live audio source 110 or audio storage 112 directly to the 2 binaural channels of binaural audio. In other examples, the audio signals of the spatial audio may be downconverted to a lower number of audio signals and collectively smaller bandwidth before transmission to the cloud spatial audio processing system 106.

Figure 2:
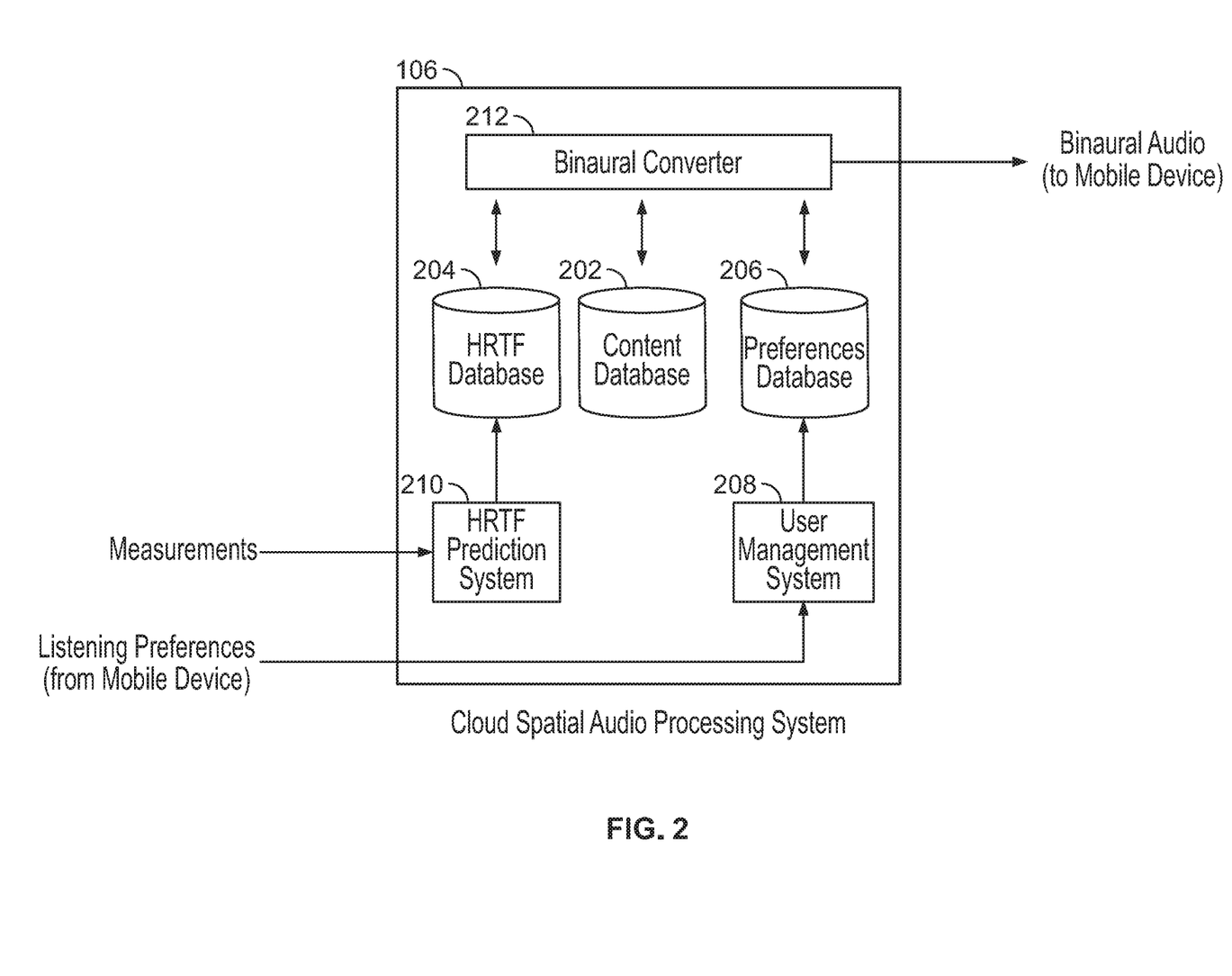
FIG. 2 is an example block diagram of a cloud spatial processing system.

FIG. 2 is an example block diagram of the cloud spatial audio processing system 106. The cloud spatial audio processing system 106 may include a content database 202, an HRTF database 204, and a preferences database 206. The cloud spatial audio processing system 106 may further include a user management system 208, an HRTF prediction system 210, and a binaural converter 212. The cloud spatial audio processing system 106 may be implemented in hardware, software, and/or a combination of hardware and software and located in the cloud.

The content database 202 may store spatial audio in a spatial audio format such as multi-channel audio, ambisonic audio, object-based audio and/or hybrid variations. The spatial audio may be associated with one or more audio qualities and spatial configurations. The audio quality may be described by sampling rate, bit depth, file format etc. The spatial configuration may be described by one of the speaker configurations of multi-channel audio, ambisonic order of ambisonic audio, and/or number of objects of object-based audio, for example. The content database 202 may receive and store the spatial audio from the audio server 108. In the case that the audio server 108 outputs live audio source 110, the content database 202 may be a buffer which temporarily stores the spatial audio for subsequent processing by the cloud spatial audio processing system 106.

The preferences database 206 may store filters of listening preferences associated with playback of audio to the listener. The user management system 208 may receive an indication of the listening preferences from the listener via the mobile station 102. The listening preferences may take many forms. For example, the listening preferences may identify a reverb of the audio played back to the listener. The cloud spatial audio processing system 106 may define a room model with reverb filters to replicate the identified reverb. The room model may be used to process the spatial audio so that the audio sounds like it has the identified reverb characterized by a length and gain. As another example, the listening preferences may identify a type of personal audio delivery device 104 used by the listener such as whether it is a headphone, headset, earphones, ear buds, or other ear accessory. The cloud spatial audio processing system 106 may define an equalization filter associated with the personal audio delivery device 104. The equalization filter may adjust a balance of frequency components of the audio played by the personal audio delivery device 104 to optimize the audio playback on the personal audio delivery device 104. The equalization filter may also specify listener preferences such as amplifying or attenuating certain frequency components, such as more or less bass. The listening preferences may also include one or more of an audio quality, a spatial configuration, and a spatial audio format of the spatial audio.

The HRTF database 204 may define head related transfer functions (HRTF) which characterize how the pinna of the listener receives sound from a sound source located at a point in space. Typically, the pinna receives the sound, directs the sound to an ear canal of the outer ear, which in turn directs the sound to the middle ear. The middle ear of the human auditory system transfers the sound into fluids of an inner ear for conversion into nerve impulses. A brain then interprets the nerve impulses to hear the sound. A direction where the sound is coming from is determined based on interactions of the sound with human anatomy. The interaction includes the sound reflecting and/or reverberating and diffracting off a head, shoulder and pinna. The interaction generates audio cues which are decoded by the brain to perceive the direction where the sound is coming from. When the listener wears the personal audio delivery device 104, the personal audio delivery device 104 may occlude the pinna preventing spatialization of the sound. The HRTF allows for artificially generating the audio cues which enable spatializing sound to the listener as if comes from the point in space, e.g., azimuth, elevation, distance, when the personal audio delivery device 104 occludes the pinna of the listener. The HRTF database 204 may have a plurality of HRTFs each associated with spatializing sound located at a different point in space. The HRTF prediction system 210 may predict a personalized HRTF based on anthropometric measurements of the listener's ear, optical measurements of the listener's ear such as an image of a listener's ear, and/or acoustic measurements of how sound reaches the listener's ear. The measurements may be used to define the personalized HRTF. In examples, the prediction may be based on a machine learning algorithm which analyze a database of measurements of various ears and associated HRTFs to determine a relationship between the measurements and associated HRTFs. Then, the machine learning algorithm predicts the personalized HRTF based on the measurements of the listener's ear and the relationship.

The preferences database 206 may also define generalized filters. The generalized filters may be filters not specific to a listener such as a room model acceptable to the general population and an equalization filter that works well over a variety of personal audio delivery devices 104 and listener preferences. Further, the HRTF database 204 may include a generalized HRTF associated with a general population.

The binaural converter 212 converts the spatial audio stored in the content database 202 to the binaural audio streamed to the mobile station 102. The spatial audio, the HRTF, and the listening preferences may be input into the binaural converter 212 which then may output binaural audio. Processing may scale depending upon a number of channels of the spatial audio provided by the audio server 108, a length of reverb requested by a listener, a type of personal audio delivery device 104 used by the listener, and/or load on the binaural converter 212, among other criteria. For example, some listeners may prefer a more reverberant experience as opposed to others. Conversion of spatial audio to binaural audio to produce the more reverberant experience will require more processing. As another example, some audio content may be available in higher spatial resolution (HOA) requiring more processing, while other content may be available in lower spatial resolution (FOA) requiring less processing. In another example, more listeners may want to receive binaural audio at certain times of the day requiring the cloud spatial audio processing system 106 to process more spatial audio and stream more binaural audio channels. Processing may vary for other reasons as well.

Figure 3:
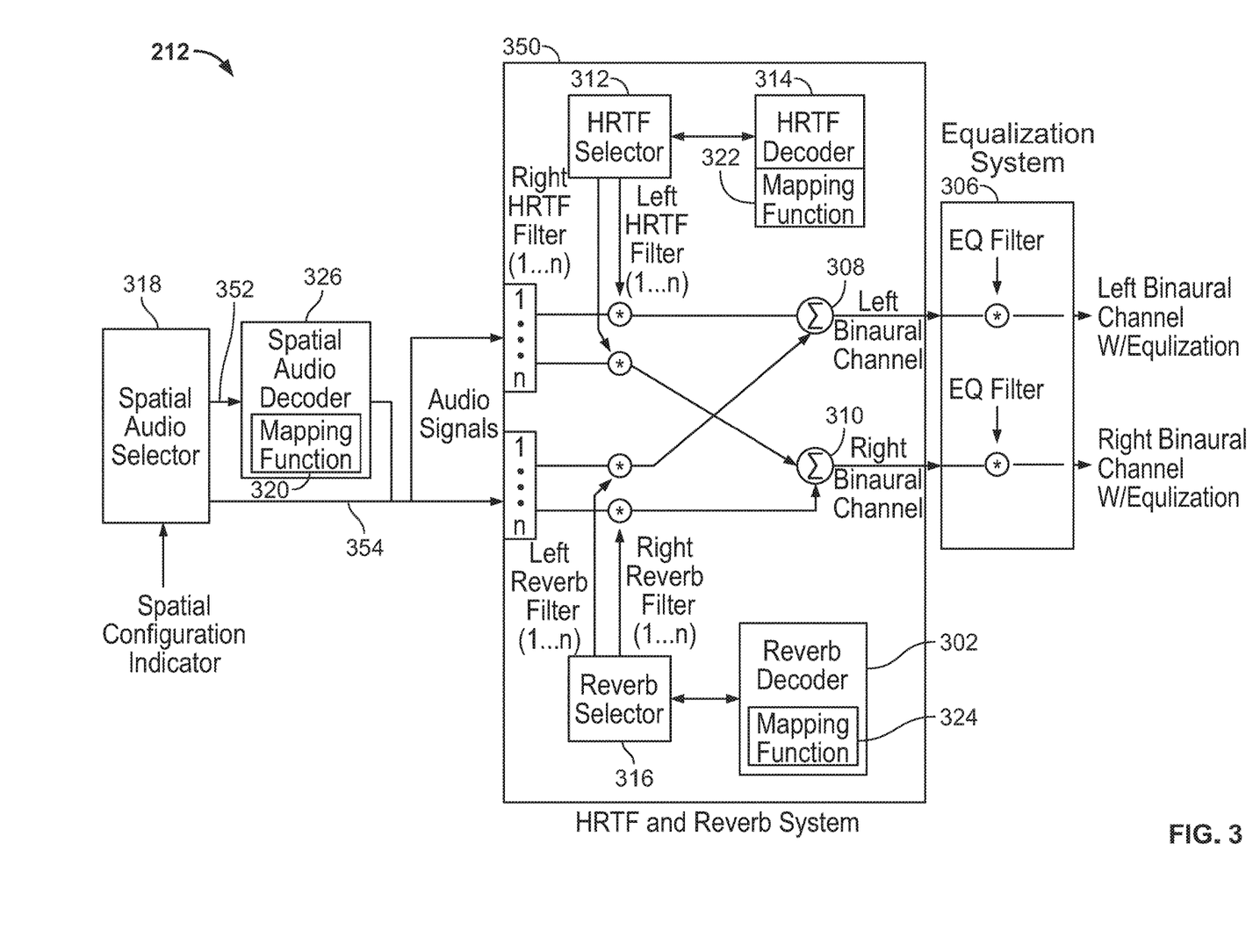
FIG. 3 is an example block diagram of a binaural converter.

FIG. 3 is an example block diagram of the binaural converter 212 for converting spatial audio to binaural audio. The example block diagram shows functionality of the binaural converter 212. The binaural converter 212 comprises a spatial audio selector 318, a spatial audio decoder 326, an HRTF and Reverb System 350, and an equalization system 306, each of which may be implemented in hardware, software, and/or a combination of hardware and software.

The spatial audio selector 318 may obtain spatial audio from the content database 202 which matches a spatial configuration and spatial audio format. In examples, a listener may provide an indication of a spatial audio format and/or spatial configuration of the spatial audio as one of the listening preferences which is provided to the spatial audio selector 318. The content database 202 may store multiple spatial configurations of spatial audio with a corresponding tag or other indicator which indicates a type of the spatial configuration and spatial audio format of the spatial audio. The spatial audio selector 318 may provide the listening preference to the content database 202, the content database 202 may identify the spatial audio having the indicated spatial configuration and spatial audio format by matching the tag with the indication, and the content database 202 may provide the matching spatial audio which is received by the spatial audio selector 318. In examples, the listener may indicate other criteria of the spatial audio such as an audio quality or genre of the spatial audio. The content database 202 may provide the spatial audio which also matches the other criteria in a manner similar to how the spatial configuration and spatial audio format of the spatial audio is identified.

In examples, the spatial audio selector 318 may also determine whether the spatial audio received from the content database 202 was downconverted from a higher resolution spatial audio. The spatial audio may also have a tag or other indication which indicates to the spatial audio selector 318 whether the spatial audio was downconverted from a higher resolution spatial audio. In examples, a number of audio signals associated with a spatial audio may indicate a resolution of the spatial audio. For example, 7.1.2 multi-channel audio associated with 10 audio signals may have a higher resolution compared to FOA associated with 4 audio signals. If the spatial audio was not downconverted, then the spatial audio selector 318 may provide the spatial audio to the HRTF and Reverb System 350 via link 354. If the spatial audio was downconverted, then the spatial audio selector 318 provides the spatial audio to the spatial audio decoder 326 via link 352 which decodes the spatial audio to the spatial audio format and spatial configuration that the spatial audio was recorded in which is at a higher resolution, and then provided to the HRTF and Reverb System 350 via link 354. The higher resolution results in a better spatial audio experience than what was requested by the listener. Links 352 and 354 may be communication links for conveying data associated with the spatial audio.

In examples, the spatial audio decoder 326 may define a mapping function 320 which maps a spatial audio format and spatial audio configuration provided to the spatial audio decoder 326 to a spatial audio format and spatial audio configuration it was recorded in. The spatial audio format may be a type of spatial audio such as multi-channel audio, ambisonic audio, or object-based audio and the spatial configuration may be HOA. In this regard, the spatial audio decoder 326 may have a plurality of mapping functions. A mapping function 320 may take spatial audio in one spatial audio format and spatial audio configuration and map it to spatial audio in another different spatial audio format and spatial audio configuration. Examples may include a mapping from higher order ambisonic audio to multi-channel audio associated with a speaker configuration, from multi-channel audio associated with a speaker configuration to higher order ambisonic audio, from object based audio associated with a number of objects to multichannel audio associated with a speaker configuration, among other combinations. In this regard, the mapping function decodes the spatial audio from one format to another.

To illustrate, the listener may choose to listen to first order ambisonic audio which the spatial audio selector 318 receives from the content database 202. The spatial audio selector 318 may also determine based on the tag associated with the first order ambisonic audio whether first order ambisonic audio was directly recorded by the content provider in the first order ambisonic format. If the tag indicates that the first order ambisonic was directly recorded by the content provider in the first order ambisonic format, then the spatial audio may not require any decoding, and can be directly sent out to the HRTF and Reverb System 212 as four audio signals. However, if the tag indicates that the first order ambisonic stream content was downconverted from 7.1.4 multi-channel audio, then the spatial audio decoder 326 may decode the spatial audio to 12 audio tracks associated with 7.1.4 multi-channel audio. A mapping function 320 may map the spatial audio in the first order audio ambisonic format to the spatial audio associated with 7.1.4 multi-channel audio which is then provided to the HRTF and Reverb System 350.

The HRTF and Reverb System 350 may convert the spatial audio to the binaural audio. The HRTF selector 312 and the reverb selector 316 may select, respectively, an HRTF and a room model for the left and right ear which are associated with the spatial configuration and spatial format of the audio signals to spatialize the spatial audio for the left ear and right ear.

In examples, the HRTF database 204 may have a plurality of HRTFs associated with generating audio cues for spatializing spatial audio in different spatial configurations and spatial audio formats. For example, the HRTF database 204 may have an HRTF for a left ear and an HRTF for a right ear which each comprises HRTF filters to spatialize spatial audio in the form of ambisonic audio with a spatial configuration. As another example, the HRTF database 204 may have an HRTF for a left ear and an HRTF for a right ear which each comprises HRTF filters to spatialize sound associated with multi-channel audio with a spatial configuration. The HRTF selector 312 may select the HRTF for a left ear and the HRTF for a right ear each associated with the spatial audio format and spatial configuration which matches the spatial audio format and spatial configuration of the audio signals input into the HRTF and Reverb System 350. The HRTF for a left ear and the HRTF for a right ear may be a personalized HRTF or generalized HRTF stored in the HRTF database 204.

An HRTF decoder 314 may determine the HRTF of a left ear and an HRTF for a right ear for the spatial audio format and spatial configuration of the audio signals input into the HRTF and Reverb System 350 if the HRTF is not already stored in the HRTF database 204. The HRTF determined by the HRTF decoder 314 for each ear may be based on an HRTF stored in the HRTF database 204 which defines respective HRTF filters for generating audio cues to spatialize sound from a sound source located at different points in space with respect to a listener. The HRTF decoder 314 may have a mapping function 322 such as a decoder matrix to map the HRTF filters associated with one or more of the points in the space to the one or more points in space associated with the spatial audio format and the spatial configuration. For example, the respective HRTF filters for one or more of the points in the space may be mapped to spherical harmonics to define the HRTF for FOA which include respective HRTF filters for the w, x, y, z audio signals. As another example, the respective HRTF filters for one or more of the points in the space may be mapped/decoded to speaker positions associated with 7.1.4 multi-channel audio to define the respective HRTF filters for the 12 audio signals.

In some examples, the HRTF database 204 may store an HRTF for a left ear and an HRTF for the right ear that each define HRTF filters for generating audio cues to spatialize sound from a sound source located at different points in space with respect to a listener. To determine the HRTF of the left ear for the spatial configuration of the spatial audio in the spatial audio format, the HRTF decoder 314 may apply the mapping function 322 to the HRTF for the left ear stored in the HRTF database 204 which defines respective HRTF filters for generating audio cues to spatialize sound from a sound source located at different points in space with respect to a listener. To determine the HRTF of the right ear for the spatial configuration of the spatial audio, the HRTF decoder 314 may apply the mapping function 322 to the HRTF for the right ear stored in the HRTF database 204 which defines respective HRTF filters for generating audio cues to spatialize sound from a sound source located at different points in space with respect to a listener. The HRTF selector 312 may receive the HRTF from the HRTF decoder 314.

The HRTF for the left ear and the HRTF for the right ear may be applied to the audio signals input into the HRTF and Reverb System 350. The HRTF for a left ear and an HRTF for a right ear and may include HRTF filters associated with each HRTF. The HRTF filters may be convolved with the audio signals. For example, the four audio signals associated with first order ambisonic audio may be convolved with the respective HRTF filters associated with the first order ambisonic audio for the left ear to produce four responses for the left ear which are summed together at summer 308. A similar process may be performed to convolve the HRTF filters of the right ear with the audio signals. For example, the four audio signals associated with first order ambisonic audio may be convolved with the respective HRTF filters associated with the first order ambisonic audio for the right ear to produce four responses for the right ear which are summed together at summer 310.

A reverb selector 316 may also select a room model for the left ear and a room model for a right ear each associated with a spatial configuration and spatial audio format that matches the spatial configuration and spatial audio format of the spatial audio input to the HRTF and Reverb System 350. In examples, the preferences database 206 may have a plurality room models associated with generating reverb for spatial audio in different spatial audio formats and spatial configurations. For example, the preferences database 206 may have a room model to generate reverb for spatial audio in the form of first order ambisonic audio for a left or right ear which include respective reverb filters for the w, x, y, z audio signals. As another example, the preferences database 206 may have a room model to generate reverb for spatial audio in the form of multi-channel audio associated with a speaker configuration for a left or right ear which include respective reverb filters for the audio signals. The reverb selector 316 may select the room model for the left ear and the room model for the right ear associated with a spatial audio format and spatial configuration which matches the spatial audio format and spatial configuration of the audio signals input into the HRTF and Reverb System 350. The reverb filters of the room model associated with each ear may be then be convolved with the respective audio signals of the spatial audio and summed by summer 308, 310.

In examples, a reverb decoder 302 may determine the room model of a left ear and room model for the right ear for the spatial configuration of the spatial audio if the room model is not already stored in the preferences database 206. The room model determined by the reverb decoder 302 for each ear may be based on a room model stored in the preferences database 206 which defines reverb filters for a sound source located at the various points in space. A mapping function 324 of the reverb decoder 302 such as a decoder matrix may map/decode the reverb filters for one or more of the points in the space to the one or more points in space associated with the spatial format and spatial configuration of the audio signals input into the HRTF and Reverb System 350 in a manner similar to the HRTF filters were mapped. In this regard, the mapping function 324 may determine the room model associated with the spatial format and spatial configuration associated with the spatial audio input into the HRTF and Reverb System 350. The reverb selector 316 may then receive the room model from the reverb decoder 302 and use the reverb filters of this room model to convolve with the audio signals input into the HRTF and Reverb System 350 which are summed by summers 308, 310.

The summer 308 and summer 310 further sum convolution results associated with the HRTF filters and reverb filters for a left and right ear, respectively. The output from the summer 308 and 310 may be binaural audio that preserves spatialization of the spatial audio. In some examples, the equalization system 306 may filter the binaural audio. The binaural channels from the HRTF and Reverb System 350 may be sent to the equalization system 306 where the left are right binaural channels are convolved with an equalization (EQ) filter. The type of equalization may depend upon the listener preference, for example, it may depend upon a type of the listener's personal audio delivery device 104. The type of equalization may also depend upon the listener's listening preference. For example, one listener may prefer more bass compared to the other. The binaural audio output by the equalization system 306 is then streamed to the mobile station 102 to produce an immersive spatial audio experience for the listener without the mobile station 102 having to convert the spatial audio to the binaural audio.

Figure 4:
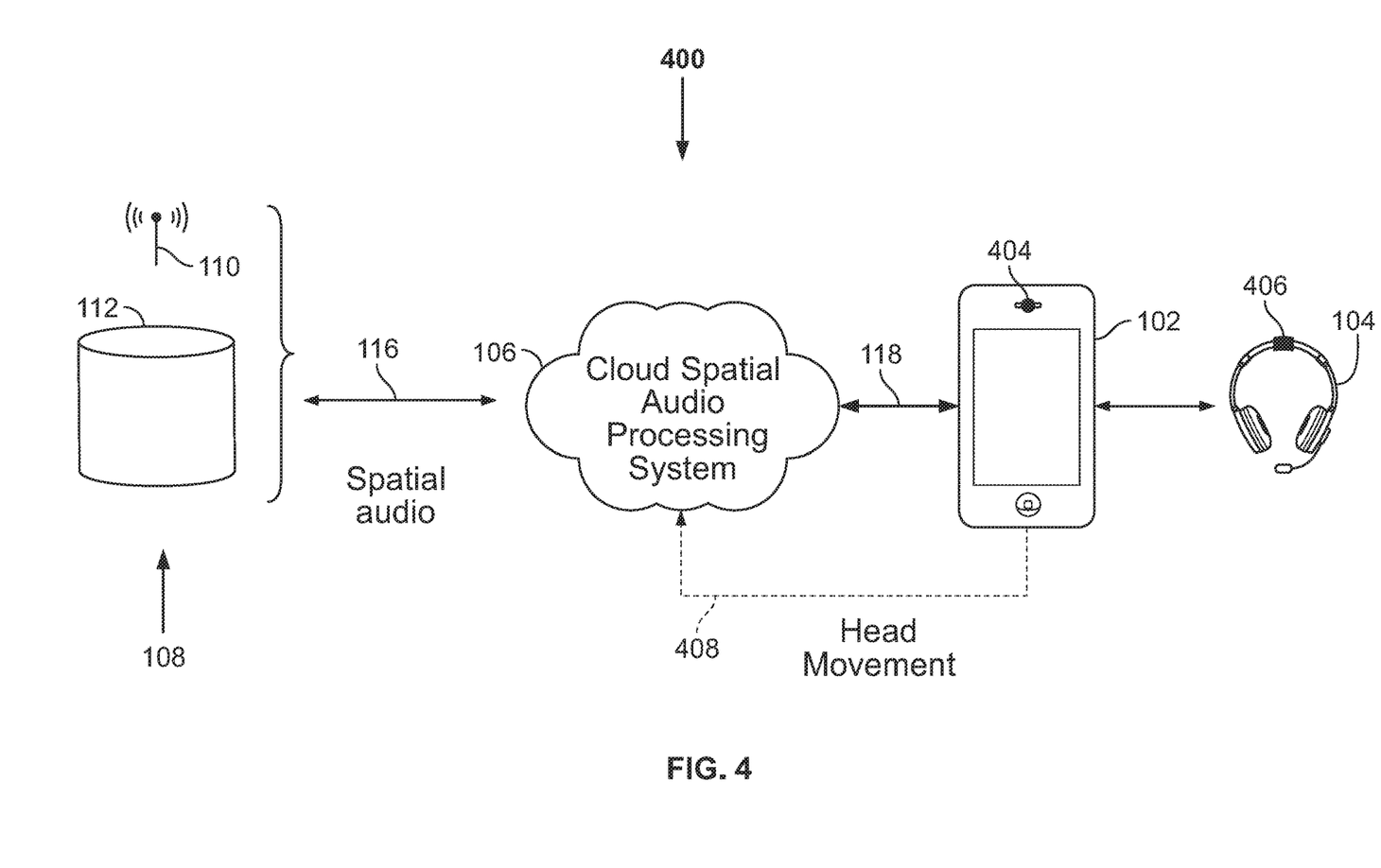
FIG. 4 illustrates an example system for binauralizing spatial audio into binaural audio in the cloud based on movement of a listener's head and streaming the binaural audio to the mobile station having the personal audio delivery device.

In some examples, the mobile station 102 may be able to track movement of a listener's head movement. A cloud spatial audio processing system 106 may be able to use this information to further spatialize the spatial audio based on the movement of the listener's head.

FIG. 4 is an example system 400 for binauralizing spatial audio into binaural audio in the cloud based on movement of a listener's head and streaming binaural audio to a mobile station 102 associated with a personal audio delivery device 104. The system 400 may include the audio server 108. The audio server 108 may include a live audio source 110 of spatial audio or the audio storage 112 which stores spatial audio, a cloud spatial audio processing system 106, the mobile station 102, and the personal audio delivery device 104. The audio server 108 may send spatial audio such as HOA to the cloud spatial audio processing system 106. The mobile station 102 may provide an indication 408 of head movement of a listener. The indication 408 may take many forms. For example, the indication 408 may be a video of the head movement captured by a camera 404 of the mobile station 102 which is then sent to the cloud spatial audio processing system 106 over the communication link 118. As another example, a motion sensor 406 such as a gyroscope may be attached to the personal audio delivery device 104 worn by the listener. The motion sensor 406 may track the head movement of the listener. The motion sensor 406 may output the indication 408 which is then sent to the cloud spatial audio processing system 106 over the communication link 118. The cloud spatial audio processing system 106 may convert the spatial audio to binaural audio based on the head movement so that the audio is spatialized with the head movement. In the conversion, the indication of head movement may be translated into a degree of a rotation of the listener's head which dynamically changes as the listener's head moves. The spatial audio is rotated by the degree of rotation via a rotation matrix, the rotated spatial audio is binauralized with a binaural converter 212, and the binauralized audio is sent to the mobile station 102. The spatial audio may be arranged to track the head movement in other ways as well.

In other examples, the spatial audio may be converted from a higher order spatial audio such as HOA to a lower order spatial audio such as FOA based on the head movement so that the spatial audio is correlated to the head movement. Then the lower order spatial audio may be streamed to the mobile station for conversion to binaural audio rather than the conversion being done by the cloud spatial audio processing system 106. If the streamed audio is FOA, then the mobile station 102 may have enough compute resources to perform the binauralization rather than it being performed in the cloud.

Example Operations

Figure 5:
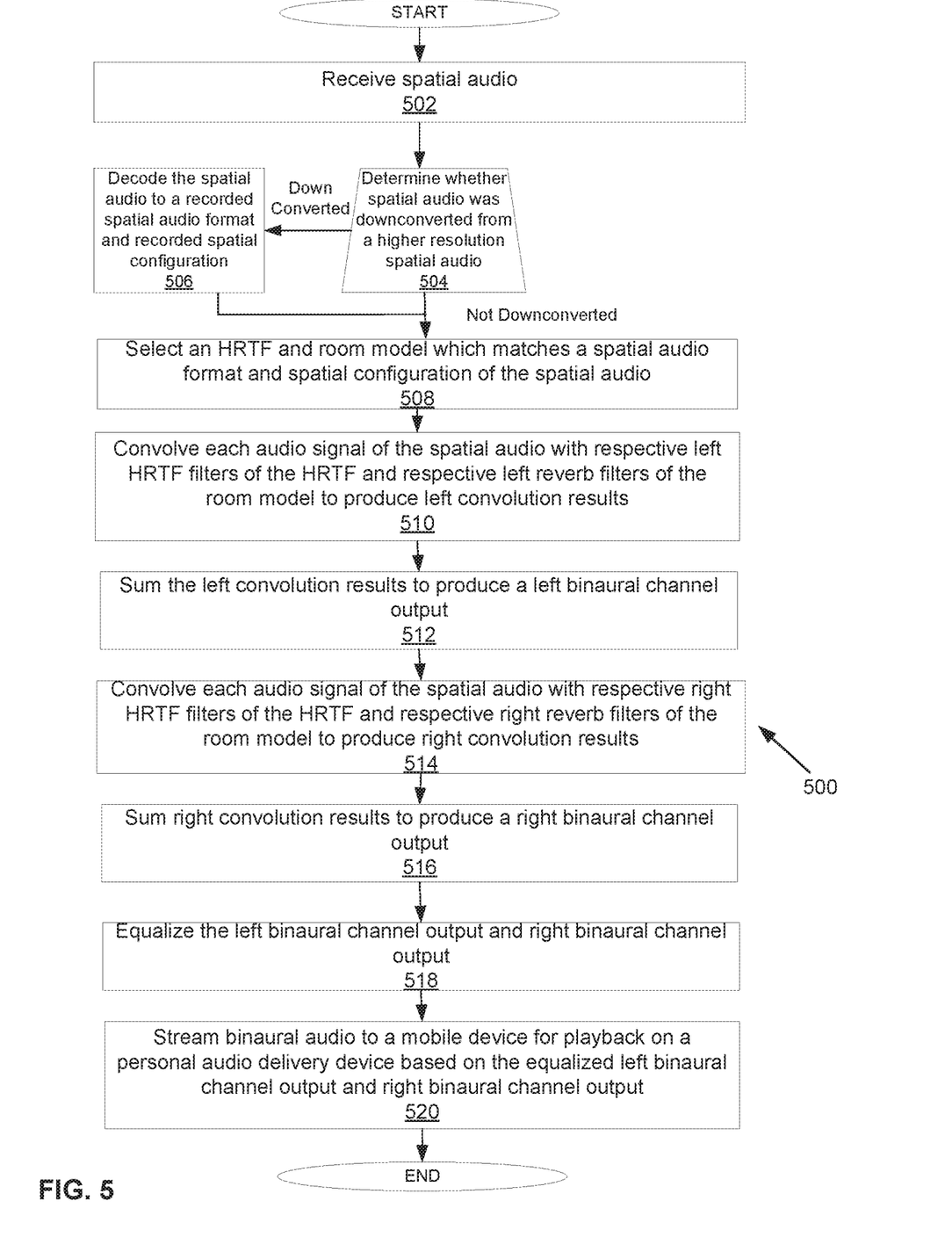
FIG. 5 is an example flow chart of functions associated with binauralizing spatial audio into binaural audio in the cloud.

FIG. 5 is an example flow chart 500 of functions associated with binauralizing spatial audio into binaural audio in the cloud. The functions may be performed by the binaural converter 212 in hardware, software, or a combination of hardware and software. The spatial audio may be ambisonic audio, multi-channel audio, and/or object-based audio which is converted to the binaural audio associated with a left and right binaural channel and played on the personal audio delivery device 104.

At 502, a binaural converter 212 receives spatial audio. The spatial audio may be in a spatial audio format such as ambisonic audio, multi-channel audio, and/or object-based audio with a spatial configuration. In examples, the spatial audio format and spatial configuration may be indicated by a listener and used by the cloud spatial audio processing system 106 to obtain the spatial audio.

At 504, a determination is made whether the spatial audio is downconverted from higher resolution spatial audio. If the spatial audio was downconverted, then at 506 the spatial audio is decoded to a recorded spatial audio format by the spatial audio decoder 326 and recorded spatial configuration which is at the higher resolution and processing continues to block 508. If the spatial audio was not downconverted, then processing continues from block 502 to block 508.

At 508, an HRTF and room model is selected by the HRTF selector 312 and reverb selector 316, respectively that match a spatial audio format and spatial configuration of the spatial audio. The spatial audio may be the decoded spatial audio from block 506 or the spatial audio from block 504. In some examples, the HRTF and/or reverb model may be generated by the HRTF decoder 314 and/or reverb decoder 302, respectively, to generate the matching HRTF and room model.

At 510, each audio signal of the spatial audio is convolved with respective left HRTF filters of the HRTF and respective left reverb filters of the room model to produce left convolution results. At 512, the left convolution results are summed by summer 308 to produce a left binaural channel output.

At 514, each audio signal of the spatial audio is convolved with respective right HRTF filters of the HRTF and respective right reverb filters of the room model to produce right convolution results. At 516, the right convolution results are summed by summer 310 to produce a right binaural channel output.

At 518, the left binaural audio channel output and right binaural audio channel output is equalized by the equalization system 306. The equalization may be a personal audio delivery device equalization filter specific to a type of personal audio delivery device that the listener uses or general to a variety of different types of personal audio delivery devices. Further, in some examples, the equalization filter may equalize the binaural audio to listener preferences.

Figure 6:
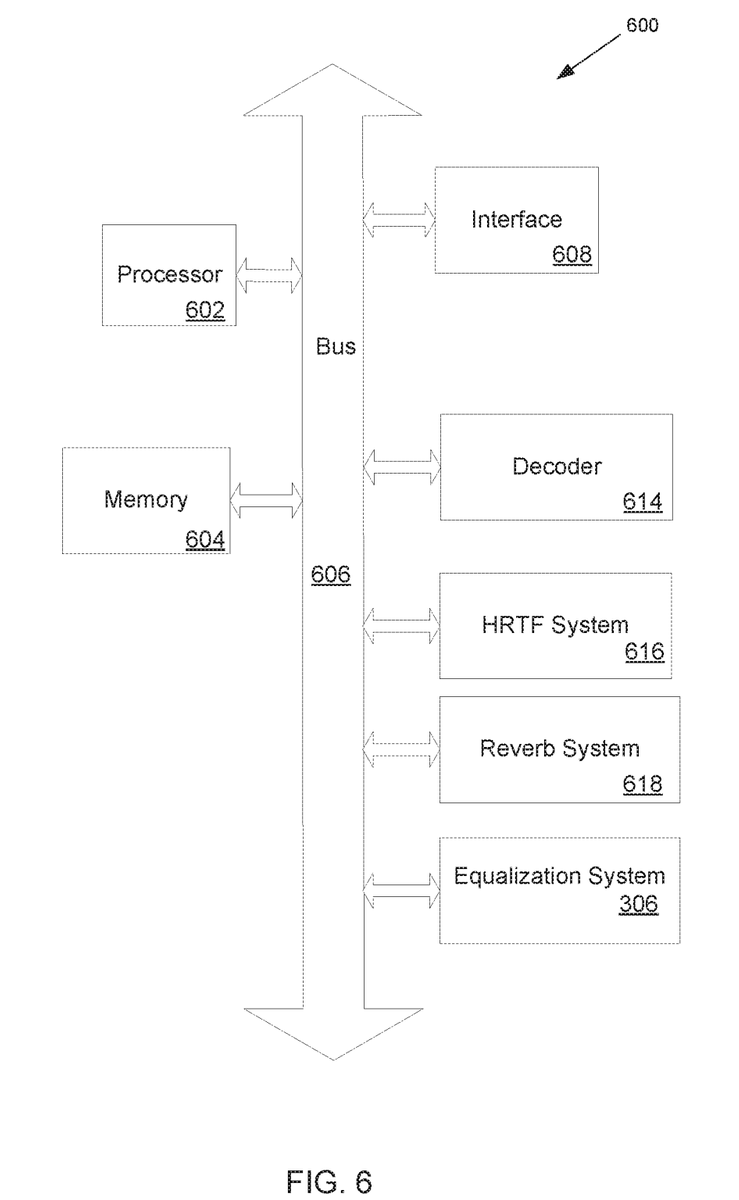
FIG. 6 is another example block diagram of the binaural converter.

At 520, the binaural audio is streamed to the mobile station 102 for playback on a personal audio delivery device 104 based on the equalized left binaural channel output and right binaural channel output. By performing the conversion of spatial audio to binaural audio on the cloud spatial audio processing system 106, sufficient bandwidth exists to stream the binaural audio from the cloud spatial audio processing system 106 to the mobile station 102 over a wireless connection such as the 3G, 4G, 5G, or WiFi connection. Depending upon the audio quality, the listener may have a spatial experience better or similar to the spatial audio binauralized on the mobile station Example Apparatus FIG. 6 is another example block diagram 600 of the binaural converter 212 for converting spatial audio to binaural audio. The block diagram 600 shows a computer architecture of the binaural converter 212. The block diagram 600 includes a computing device such as a processor 602 (possibly including multiple processors, multiple cores, multiple nodes, and/or implementing multi-threading, etc.). The block diagram 600 includes memory 604. The memory 604 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM etc.), a hard disk drive (HDD), solid state drive (SSD) or any one or more other possible realizations of non-transitory machine-readable media/medium. The memory 604 may store, for example, spatial audio, listening preferences, HRTFs, and/or room models.

The block diagram 600 includes an interface 608, decoder 614, HRTF system 616, reverb system 618, and equalization system 306. The interface 608 may facilitate receiving spatial audio from a content producer or from a live broadcast and providing binaural audio to the mobile station 102. The decoder 614 may convert the one or more of the spatial audio, HRTF, and room model from one spatial configuration and/or spatial audio format to another. The HRTF system 616 may apply an HRTF to the spatial audio and a reverb system 618 may apply a room model to the spatial audio. The HRTF system 616 and reverb system 618 are shown as separate systems, but may be implemented as a single system in some examples. The equalization system 306 may filter the binaural audio with an equalization filter.

The block diagram 600 also includes a bus 606 (e.g., PCI, ISA, PCI-Express, NuBus, etc.). The processor 602, memory 604, interface 608, decoder 614, HRTF system 616, reverb system 618, and equalization system 306 may be coupled to the bus 606.

The block diagram 600 may implement any one of the previously described functionalities for outputting the binaural audio partially, (or entirely) in hardware and/or software (e.g., computer code, program instructions, program code, computer instructions) stored on a non-transitory machine readable medium/media. Further, realizations can include fewer or additional components not illustrated in FIG. 6 (e.g., video cards, audio cards, additional network interfaces, peripheral devices, etc.). The processor 602 and the memory 604 are coupled to the bus 606. Although illustrated as being coupled to the bus 606, the memory 604 can be coupled to the processor 602.

In examples described above, the binaural converter 212 applies both an HRTF and room model to spatial audio associated with audio signals input into the binaural converter 212. In other examples, the HRTF may only be applied to the spatial audio or a room model may only be applied to the spatial audio without any loss of generalization.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

Example Embodiments

Example Embodiments Include the Following

Embodiment 1: A method comprising: receiving spatial audio from an audio server over a first communication link; converting, by a cloud spatial audio processing system, the spatial audio into binaural audio; and streaming the binaural audio from the cloud spatial audio processing system to a mobile station over a second communication link for playback on a personal audio delivery device.

Embodiment 2: The method of Embodiment 1, wherein the spatial audio is at least one of object-based audio, ambisonic audio, and multi-channel audio.

Embodiment 3: The method of Embodiment 1 or 2, wherein the audio server downconverts or does not downconvert the spatial audio to a fewer number of audio signals before sending the spatial audio over the first communication link to the cloud spatial audio processing system.

Embodiment 4: The method of any one of Embodiment 1 to 3, wherein converting the spatial audio to the binaural audio comprises applying an HRTF to the spatial audio, wherein a spatial format and a spatial configuration of the HRTF matches a spatial format and a spatial configuration of the spatial audio.

Embodiment 5: The method of any one of Embodiment 1 to 4, where the HRTF is a personalized HRTF or a generalized HRTF.

Embodiment 6: The method of any one of Embodiment 1 to 5, wherein converting the spatial audio to the binaural audio comprises applying a room model to the spatial audio, wherein a spatial format and spatial configuration of the room model matches a spatial format and spatial configuration of the spatial audio.

Embodiment 7: The method of any one of Embodiment 1 to 6, wherein the room model is defined by a listener.

Embodiment 8: The method of any one of Embodiment 1 to 7, wherein a bandwidth of the second communication link which is a $3^{rd}$ generation (3G), $4^{th}$ generation (4G), $5^{th}$ generation (5G), or WiFi connection is less than a bandwidth of the first communication link.

Embodiment 9: The method of any one of Embodiment 1 to 8, further comprising receiving an indication of head movement by a listener; and wherein converting the spatial audio into binaural audio comprises converting the spatial audio into the binaural audio based on the indication of the head movement.

Embodiment 10: The method of any one of Embodiment 1 to 9, further comprising applying an equalization filter to left and right binaural audio channels of the binaural audio.

Embodiment 11: A non-transitory, machine-readable medium having instructions stored thereon that are executable by a cloud spatial audio processing system to perform operations comprising: receiving spatial audio from an audio server over a first communication link; converting the spatial audio into binaural audio; and streaming the binaural audio from the cloud spatial audio processing system to a mobile station over a second communication link for playback on a personal audio delivery device.

Embodiment 12: The machine-readable medium of Embodiment 11, wherein the spatial audio is at least one of object-based audio, ambisonic audio, and multi-channel audio.

Embodiment 13: The machine-readable medium of Embodiment 11 or 12, wherein the instructions for converting the spatial audio to the binaural audio comprises applying an HRTF to the spatial audio, wherein a spatial format and a spatial configuration of the HRTF matches a spatial format and a spatial configuration of the spatial audio.

Embodiment 14: The machine-readable medium of any one of Embodiment 11 to 13, wherein the instructions for converting the spatial audio to the binaural audio comprises applying a room model to the spatial audio, wherein a spatial format and spatial configuration of the room model matches a spatial format and spatial configuration of the spatial audio.

Embodiment 15: The machine-readable medium of any one of Embodiment 11 to 14, wherein a bandwidth of the second communication link which is a 3G, 4G, or 5G, or WiFi connection is less than a bandwidth of the first communication link.

Embodiment 16: A system comprising: a mobile station; a personal audio delivery device in communication with the mobile station; a non-transitory, machine-readable medium having instructions stored thereon that are executable by a cloud spatial audio processing system to perform operations comprising: receiving spatial audio from an audio server over a first communication link; converting the spatial audio into binaural audio; and streaming the binaural audio from the cloud spatial audio processing system to a mobile station over a second communication link for playback on the personal audio delivery device.

Embodiment 17: The system of Embodiment 16, wherein the spatial audio is at least one of object-based audio, ambisonic audio, and multi-channel audio.

Embodiment 18: The system of Embodiment 16 or 17, wherein the instructions for converting the spatial audio to the binaural audio comprises applying an HRTF to the spatial audio, wherein a spatial format and a spatial configuration of the HRTF matches a spatial format and a spatial configuration of the spatial audio.

Embodiment 19: The system of any one of Embodiment 16 to 18, further comprising instructions converting the spatial audio to the binaural audio comprises applying a room model to the spatial audio, wherein a spatial format and spatial configuration of the room model matches a spatial format and spatial configuration of the spatial audio.

Embodiment 20: The system of claim any one of Embodiment 16 to 19, wherein a bandwidth of the second communication link which is a 3G, 4G, or 5G, or WiFi connection is less than a bandwidth of the first communication link.

We claim:

1. A method comprising:
receiving, by a cloud spatial audio processing system, spatial audio from an audio server over a first communication link;
converting, by the cloud spatial audio processing system, the spatial audio into binaural audio, wherein converting the spatial audio to the binaural audio comprises applying an HRTF to the spatial audio, and wherein a spatial format and a spatial configuration of the HRTF is mapped using a mapping function to a spatial format and a spatial configuration of the spatial audio; and
streaming the binaural audio from the cloud spatial audio processing system to a mobile station over a second communication link for playback on a personal audio delivery device.

2. The method of claim 1, wherein the spatial audio is at least one of object-based audio, ambisonic audio, and multi-channel audio.

3. The method of claim 1, wherein the audio server downconverts or does not downconvert the spatial audio to a fewer number of audio signals before sending the spatial audio over the first communication link to the cloud spatial audio processing system.

4. The method of claim 1, wherein the HRTF is a personalized HRTF or a generalized HRTF.

5. The method of claim 1, wherein converting the spatial audio to the binaural audio comprises applying a room model to the spatial audio, wherein a spatial format and spatial configuration of the room model matches a spatial format and spatial configuration of the spatial audio.

6. The method of claim 5, wherein the room model is defined by a listener.

7. The method of claim 1, wherein a bandwidth of the second communication link which is a $3^{rd}$ generation (3G), $4^{th}$ generation (4G), $5^{th}$ generation (5G), or WiFi connection is less than a bandwidth of the first communication link.

8. The method of claim 1, further comprising receiving an indication of head movement by a listener; and wherein converting the spatial audio into binaural audio comprises converting the spatial audio into the binaural audio based on the indication of the head movement.

9. The method of claim 1, further comprising applying an equalization filter to left and right binaural audio channels of the binaural audio.

10. A non-transitory, machine-readable medium having instructions stored thereon that are executable by a cloud spatial audio processing system to perform operations comprising:
receiving, by the cloud spatial audio processing system, spatial audio from an audio server over a first communication link;
converting, by the cloud spatial audio processing system, the spatial audio into binaural audio, wherein converting the spatial audio to the binaural audio comprises applying an HRTF to the spatial audio, and wherein a spatial format and a spatial configuration of the HRTF is mapped using a mapping function to a spatial format and a spatial configuration of the spatial audio; and
streaming the binaural audio from the cloud spatial audio processing system to a mobile station over a second communication link for playback on a personal audio delivery device.

11. The machine-readable medium of claim 10, wherein the spatial audio is at least one of object-based audio, ambisonic audio, and multi-channel audio.

12. The machine-readable medium of claim 10, wherein the instructions for converting the spatial audio to the binaural audio comprises applying a room model to the spatial audio,
wherein a spatial format and spatial configuration of the room model matches a spatial format and spatial configuration of the spatial audio.

13. The machine-readable medium of claim 10, wherein a bandwidth of the second communication link which is a 3G, 4G, or 5G, or WiFi connection is less than a bandwidth of the first communication link.

14. The machine-readable medium of claim 10, wherein the HRTF is a personalized HRTF or a generalized HRTF.

15. A system comprising:
a mobile station;
a personal audio delivery device in communication with the mobile station;
a non-transitory, machine-readable medium having instructions stored thereon that are executable by a cloud spatial audio processing system to perform operations comprising:
receiving, by the cloud spatial audio processing system, spatial audio from an audio server over a first communication link;
converting, by the cloud spatial audio processing system, the spatial audio into binaural audio, wherein converting the spatial audio to the binaural audio comprises applying an HRTF to the spatial audio, and wherein a spatial format and a spatial configuration of the HRTF is mapped using a mapping function to a spatial format and a spatial configuration of the spatial audio; and
streaming the binaural audio from the cloud spatial audio processing system to the mobile station over a second communication link for playback on the personal audio delivery device.

16. The system of claim 15, wherein the spatial audio is at least one of object-based audio, ambisonic audio, and multi-channel audio.

17. The system of claim 15, further comprising instructions for converting the spatial audio to the binaural audio comprises applying a room model to the spatial audio, wherein a spatial format and spatial configuration of the room model matches a spatial format and spatial configuration of the spatial audio.

18. The system of claim 15, wherein a bandwidth of the second communication link which is a 3G, 4G, or 5G, or WiFi connection is less than a bandwidth of the first communication link.

19. The system of claim 15, wherein the HRTF is a personalized HRTF or a generalized HRTF.

* * * * *